US008000571B2

(12) United States Patent
Huang et al.

(10) Patent No.: US 8,000,571 B2
(45) Date of Patent: Aug. 16, 2011

(54) LIGHT EMITTING DEVICE AND PLANAR WAVEGUIDE WITH SINGLE-SIDED PERIODICALLY STACKED INTERFACE

(75) Inventors: Jiandong Huang, Vancouver, WA (US); Pooran Chandra Joshi, Vancouver, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 171 days.

(21) Appl. No.: 12/432,209

(22) Filed: Apr. 29, 2009

(65) Prior Publication Data

US 2010/0278475 A1 Nov. 4, 2010

(51) Int. Cl.
*G02B 6/34* (2006.01)

(52) U.S. Cl. .......... 385/37; 257/22

(58) Field of Classification Search .......... 385/37, 385/131; 359/172

See application file for complete search history.

(56) References Cited

U.S. PATENT DOCUMENTS

| | | | | |
|---|---|---|---|---|
| 6,157,047 | A * | 12/2000 | Fujita et al. | 257/51 |
| 6,587,620 | B2 * | 7/2003 | Koyama et al. | 385/37 |
| 2005/0151128 | A1 * | 7/2005 | Augusto | 257/22 |
| 2006/0115917 | A1 * | 6/2006 | Linden | 438/46 |
| 2007/0091953 | A1 * | 4/2007 | Ledentsov et al. | 372/43.01 |
| 2009/0040599 | A1 * | 2/2009 | Huang et al. | 359/341.3 |
| 2009/0090925 | A1 * | 4/2009 | Saito et al. | 257/98 |

* cited by examiner

*Primary Examiner* — Charlie Peng
*Assistant Examiner* — Peter Radkowski
(74) *Attorney, Agent, or Firm* — Law Office of Gerald Maliszewski; Gerald Maliszewski

(57) ABSTRACT

Light emitting and waveguide devices with single-sided photonic bandgaps are provided. The light emitting device is formed from a heavily doped silicon (Si) bottom electrode, and a Si-containing dielectric layer embedded Si nanoparticles overlying the bottom electrode. A transparent indium tin oxide (ITO) top electrode overlies the Si-containing dielectric layer, and a photonic bandgap (PBG) Bragg reflector underlies the Si bottom electrode. The PBG Bragg reflector includes at least one periodic bi-layer of films with different refractive indexes. The single-sided photonic bandgap planar waveguide interface is formed from a planar waveguide and a PBG Bragg reflector underlying the planar waveguide.

21 Claims, 11 Drawing Sheets

LIGHT EMITTING DEVICE AND PLANAR WAVEGUIDE WITH SINGLE-SIDED PERIODICALLY STACKED INTERFACE

BACKGROUND OF THE INVENTION

1. Field of the Invention

This invention generally relates to optical device integrated circuit (IC) fabrication and, more particularly, to a light emitting device and planar waveguide using a single-sided periodically stacked interface.

2. Description of the Related Art

Free space optical communications and optical interconnector applications require directional emissions from a light source in order to achieve high collecting efficiencies for good system power budget designs. Using Si nanoparticles as light emission centers inside silicon rich silicon oxides, SiOx (x<2) light emitting devices can be used in direct modulation modes in free space optical interconnector applications. However, when an active SiOx (x<2) layer is sandwiched between a transparent ITO (Indium Tin Oxide) top electrode and a p or n-doped silicon substrate as the other electrode, the emission efficiencies into air are poor. The poor efficiencies may be the result of two major mechanisms. First, the loss of most of emitted light into the highly doped Si substrates due to its high optical index. Second, the emitted light through the top ITO layer is not collimated, which leads to poor collection of emitted light by photodetectors. A photodetector with a fixed cross section can only cover a very small range of emission angles when the distance between the photo detector and SiOx emitter are very large, as compared to the size of SiOx emitters.

FIGS. 14A and 14B depict a silicon light emitting device and its photoluminescence and electroluminescence spectrum (prior art). A simple light emitting device is schematically shown in FIG. 14A with active Si nanoparticles embedded in a dielectric layer of SiOx, which is sandwiched between a transparent ITO electrode and highly doped Si electrodes. Silicon has indirect band gap in its bulk state, which prevents it from emitting light. However, as the size of Si particles is reduced to 2-7 nm, the Si quantum dots embedded in the dielectric can emit light with optical or electrical excitations. The EL spectrum is shown in FIG. 14B shows an EL spectrum that is slightly broader than the corresponding PL spectrum from the same materials. The peak emission can be tuned by changing the Si nanoparticles sizes using various processes.

FIG. 15 is a partial cross-sectional view of a finite difference time domain (FDTD) numerical model using the three-layer geometry shown in FIG. 14A. A SiOx layer with Si nanoparticles lies directly on top of a Si substrate, and is covered by ITO for electrical excitation. The models use point sources inside the SiOx layer to represent emission from the Si nanoparticles. As an example, at the operation wavelength of 750 nm, Si has a complex relative permittivity of $\epsilon_{Si}$=14.4−i0.09 and ITO shows a relative permittivity of $\epsilon_{ITO}$=4.0−i0.017. However, since the light coupled to the substrate is considered lost and the ITO layer is very thin (typical ~50 nm), the losses due to these materials are negligible in the simulations.

For simulation purposes, the thicknesses of the SiOx layers in these examples are assumed to be 80 nm. The typical radiated fields are shown. Extraction efficiency to air at the operation wavelength of 750 nm is calculated to be around 19.7% for SiOx on Si, and the rest of power is lost in the Si substrate.

Photodetector collection efficiencies for the device of FIG. 14A have been calculated using photodetectors and geometries depicted in FIG. 5. A 10 mm-diameter detector is located at a distance of 20 mm above the EL device having a size of 0.4 mm×0.4 mm. The calculations show that ~3.2% of the power emitted into the air can be collected by the detector. The overall collected power in the detector to the radiated power from a source embedded in the SRO cases is around 0.7%.

Integrated planar optical circuits also attract interest as a compact on-chip optical interconnector or microfluidics bio/chemical sensors, to name a few examples. SiOx LEDs with embedded nano-scaled Si particles as emission centers provide a very valuable light source for fully CMOS compatible on-chip integrations. However, it is a challenge to efficiently couple light into planar waveguides for optical processing. In typical SiOx LEDs, the active SiOx layers are sandwiched between a top electrode (normally metal, preferably ITO for low loss) and a bottom highly doped Si electrodes. No waveguiding mechanisms for the emitted light exist due to the incompatible optical index contrast between Si and SiOx.

It would be advantageous if a SiOx device could efficiently emit light into air to a photodetector or couple light into a waveguide.

It would be advantageous if a planar waveguide could be fabricated that was compatible with conventional CMOS IC devices.

SUMMARY OF THE INVENTION

Disclosed herein is a device with enhanced light collection efficiencies into air for paired Si nano-particle embedded SiOx LEDs and photodetectors, in order to achieve a good power budget for free space optical communications and sensing. Free space optic transmission systems typically require alignment between the light emitted from the light source and the photodetectors to achieve a good power budget, which is necessary for high signal to noise ratios and low bit error rates (BER). However, for simple systems and other design constraints, such collimation and alignments cannot always be easily employed. The device disclosed herein uses a single-sided photonic bandgap (PBG) Bragg reflector to improve the collection efficiency, as compared to conventional SiOx LEDs, making alignment less critical. Also disclosed is a planar waveguide using a PBG Bragg reflector to optimize waveguide coupling.

Accordingly, a light emitting device with a single-sided photonic bandgap is provided. The light emitting device is formed from a heavily doped silicon (Si) bottom electrode, and a Si-containing dielectric layer with embedded Si nanoparticles overlying the bottom electrode. A transparent indium tin oxide (ITO) top electrode overlies the Si-containing dielectric layer, and a photonic bandgap (PBG) Bragg reflector underlies the Si bottom electrode. The PBG Bragg reflector includes at least one periodic bi-layer of films with different refractive indexes.

In one aspect, the PBG Bragg reflector includes a bi-layer stack with a bottom film having a second refractive index (n2) underlying a top film with a first refractive index (n1), less than the second refractive index. However, it is also possible to fabricate the PBG Bragg reflector with a first refractive index greater than the second.

Also provided is a single-sided photonic bandgap planar waveguide interface. The interface is formed from a planar waveguide and a PBG Bragg reflector underlying the planar waveguide. The PBG Bragg reflector includes at least one periodic bi-layer of films, both with refractive indexes less than, or equal to the refractive index of the planar waveguide, and greater than 1. In one aspect, the planar waveguide is a Si-containing material embedded with Si nanoparticles, and the interface further includes a heavily doped Si bottom electrode interposed between the planar waveguide and the PBG Bragg reflector. A transparent ITO or metal top electrode overlies the planar waveguide.

Additional details of the above-described devices are provided in more detail below.

DETAILED DESCRIPTION

A distributed Bragg reflector or Bragg reflector is a reflector that may be used in waveguides, such as optical fibers. It is a structure formed from multiple layers of alternating materials with varying refractive indexes, or by periodic variation of some characteristic (such as thickness) of a dielectric waveguide. resulting in periodic variation in the effective refractive index in the guide. Each layer boundary causes a partial reflection of an optical wave. For waves whose wavelength are close to four times the optical thickness of the layers, the many reflections combine with constructive interference, and the layers act as a reflector. The range of wavelengths that are reflected is called the photonic stopband. Within this range of wavelengths, light is "forbidden" to propagate in the structure.

The reflectivity (R) of a Bragg reflector is given by $$R = \left[\frac{n_o(n_2)^{2N} - n_s(n_1)^{2N}}{n_o(n_2)^{2N} + n_s(n_1)^{2N}}\right]^2,$$

where $n_o$, $n_1$, $n_2$ and $n_s$ are the respective refractive indices of the surrounding medium, the two alternating materials, and the substrate; and N is the number of repeated pairs of low/high refractive index materials.

The bandwidth $\Delta v_0$ of the photonic stopband can be calculated by $$\Delta v_0 = \frac{4v_o}{\pi} \arcsin\left(\frac{n_2 - n_1}{n_2 + n_1}\right),$$

where $v_o$ is the central frequency of the band and the center wavelength of the PBG is responsive to the thickness of the $n_1$ and $n_2$ layers (the period of the stacks).

Thus, increasing the number of periods in a Bragg reflector increases the mirror reflectivity, and increasing the refractive index contrast between the materials in the Bragg pairs increases both the reflectivity and the bandwidth.

Figure 1:
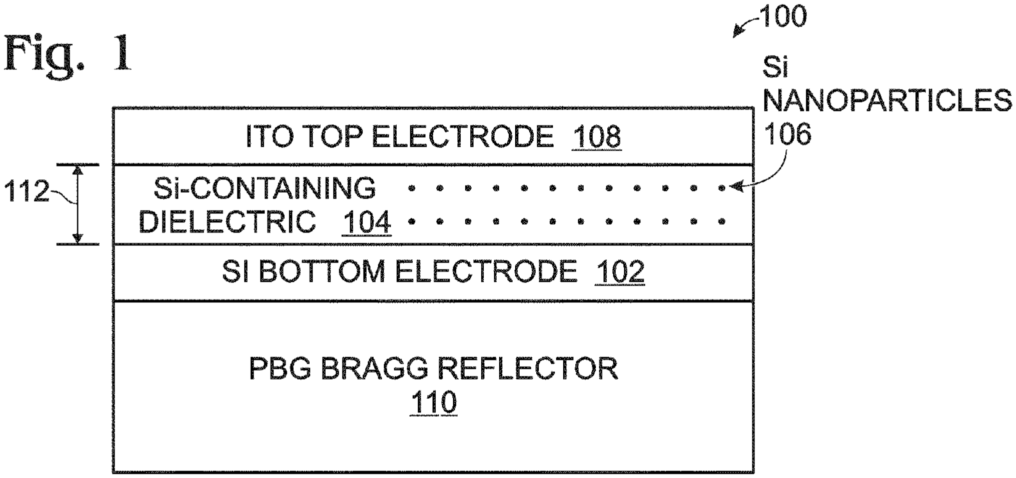
FIG. 1 is a partial cross-sectional view of a light emitting device with a single-sided photonic bandgap.

FIG. 1 is a partial cross-sectional view of a light emitting device with a single-sided photonic bandgap. The light emitting device 100 comprises a heavily doped silicon (Si) bottom electrode 102 and a Si-containing dielectric with embedded Si nanoparticles 104 overlying the bottom electrode 102. The Si-containing dielectric layer 104 may be a material such as Si, SiNx, where X<2, or SiOx, where X<2.

Typically, the Si nanoparticles 106 have a size (diameter) in the range of about 2 to 7 nanometers (nm). A transparent indium tin oxide (ITO) or metal top electrode 108 overlies the SiOx layer 104 and a photonic bandgap (PBG) Bragg reflector 110 underlies the Si bottom electrode 102. The PBG Bragg reflector 110 includes at least one periodic bi-layer of films with different refractive indexes. In one aspect, the Si-containing dielectric layer 104 has a thickness 112 in the range of about 10 to 300 nm.

In more conventional designs (e.g., FIG. 14A), ~80% of the generated light is lost being wasted into the substrate, because the substrate refractive index is greater than air. The periodic bi-layers in a Bragg reflector can be regarded as mirror that reflects into the air.

Figure 2:
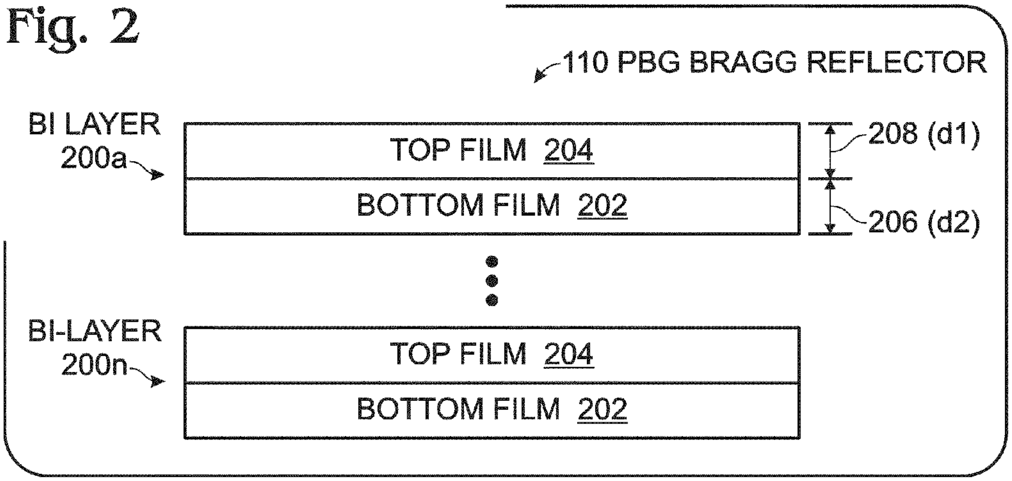
FIG. 2 is a partial cross-sectional view depicting the PBG Bragg reflector of FIG. 1 in greater detail.

FIG. 2 is a partial cross-sectional view depicting the PBG Bragg reflector 110 of FIG. 1 in greater detail. The PBG Bragg reflector 110 includes a periodic bi-layer stack 200 with a bottom film 202 having a second refractive index (n2) underlying a top film 204 with a first refractive index (n1), less than the second refractive index. Alternately, n1 may be greater than n2. Shown are bi-layer stacks **200*a* through 200*n*, where n a variable not limited to any particular value. In one aspect, the PBG Bragg reflector 110** includes at least 2 bi-layer periods. In another aspect, there are between 2 and 10 bi-layer periods.

In one particular aspect, the bottom film 202 is $SiO_2$ and the top film 204 is SiNx, where X<2. In a different aspect, the bottom film 202 is Si and the top film 204 is $SiO_2$. The thickness 206 of each bottom film 202 (d2)×(n2)+ the thickness 208 of each top film (d1)×(n1) typically equals either (0.5) times the peak wavelength of light emitted by the Si nanoparticles or (0.25) times the peak wavelength.

Returning to FIG. 1, in operation the Si-containing dielectric layer with Si nanoparticles emits light through the ITO top electrode with an efficiency of greater than 20%, and the peak light wavelength reflectivity of each periodic bi-layer is about equal to the peak wavelength of light emitted by the Si nanoparticles in the SiOx layer.

Figure 3:
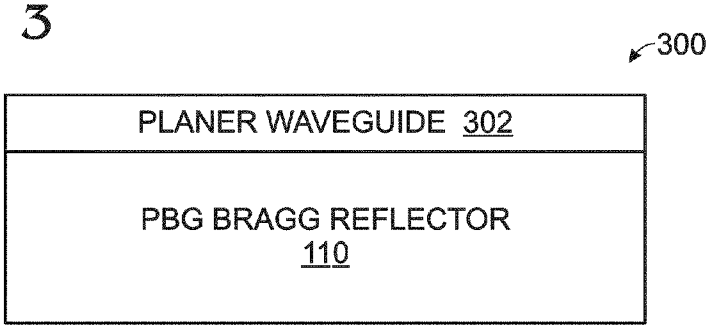
FIG. 3 is a partial cross-sectional view of a single-sided photonic bandgap planar waveguide interface.

FIG. 3 is a partial cross-sectional view of a single-sided photonic bandgap planar waveguide interface. The interface 300 comprises a planar waveguide 302, and a PBG Bragg reflector 110 underlying the planar waveguide 302. The PBG Bragg reflector 110 includes at least one periodic bi-layer of films, both with refractive indexes less than, or equal to the refractive index of the planar waveguide 302, and greater than 1.

For waveguide coupling, the Bragg reflector enhances the opportunity for light to be coupled into the surface waveguides. Light that passes through a waveguide twice has a higher opportunity for coupling than light passing through just once, even without considerations of optical field optimizations near the waveguides. The periodic bi-layers cause light reflection, especially when combined with a higher refractive index contrast, to enhance light coupling efficiencies. Generally, waveguide designs have at least one guiding mode, as compared to the vertical emission device of FIG. 1, which has a mode number of ~100 nm.

Returning to FIG. 2, the PBG Bragg reflector 110 includes a periodic bi-layer 200 with a bottom film 202 having a second refractive index (n2) underlying a top film 204 with a first refractive index (n1), less than the second refractive index. Typically, there are at least 2 bi-layer periods 200. In one aspect, the top film 204 is $SiO_2$ and the bottom film 202 is Si. In another aspect, the bottom film 202 is SiNx and the top film 204 is $SiO_2$, where X<2.

Figure 4:
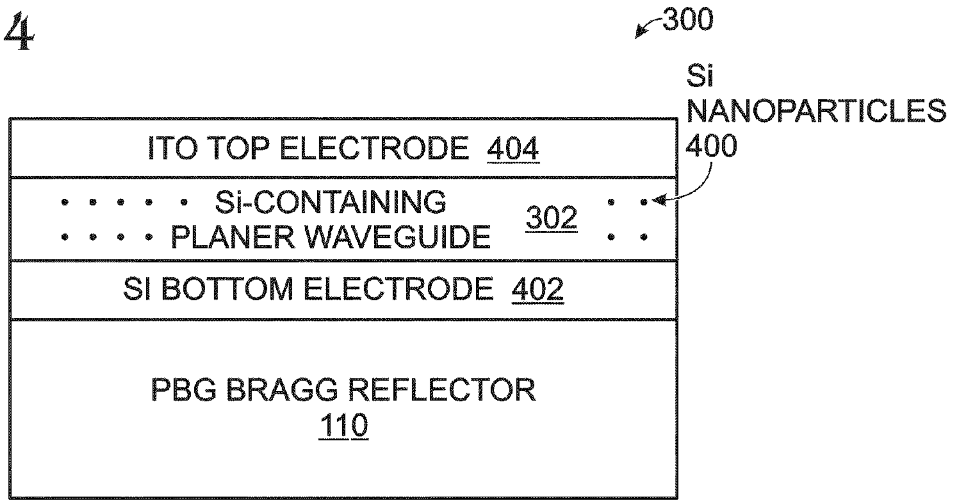
FIG. 4 is a partial cross-sectional view depicting a variation of the planar waveguide interface of FIG. 3.

FIG. 4 is a partial cross-sectional view depicting a variation of the planar waveguide interface of FIG. 3. In this aspect the planar waveguide 302 is a Si-containing dielectric material embedded with Si nanoparticles 400. For example, the planar waveguide 302 may be a material such as Si, SiNx, where X<2, or SiOx, where X<2. Typically, the Si-containing planar waveguide material includes Si nanoparticles 400 with a size in the range of about 2 to 7 nm. The interface 300 further comprises a heavily doped Si bottom electrode 402 interposed between the planar waveguide 302 and the PBG Bragg reflector 110. A transparent ITO or metal top electrode 404 overlies the planar waveguide 302.

Contrasting FIGS. 2 and 4, in one aspect the planar waveguide 302 has a thickness 406 of greater than 150 nm to insure at least one guiding mode. In another aspect, the thickness 206 of each bottom film 202 (d2)×(n2)+the thickness 208 of each top film 204 (d1)×(n1)=either (0.5) or (0.25) times the peak wavelength of light emitted by the Si nanoparticles. As explained in more detail below, in operation the planar waveguide has a coupling efficiency of greater than 10%.

Figure 5:
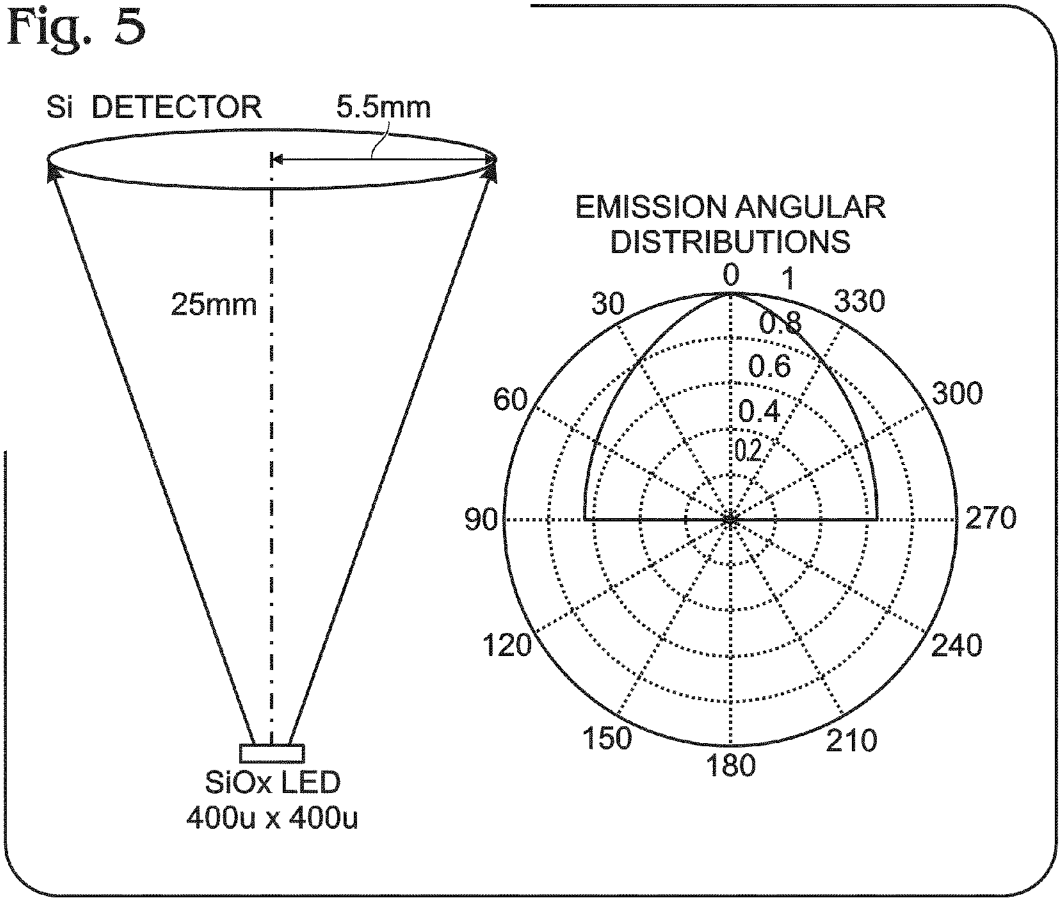
FIG. 5 depicts a system using a photodetector to collect light from a SiOx light emitting device (LED).

FIG. 5 depicts a system using a photodetector to collect light from a SiOx light emitting device (LED). For the geometries depicted, it has been found that the collection efficiencies of emitted light in air through ITO are ~3%, with the shown angular distribution. The higher refractive index of Si (~3.45), is much higher than that of SiOx (~2.0) and air (~1.0), leading to a higher extraction (e.g., ~70%) of emissions from the active SiOx layers, than into the air through ITO. This result is verified with FDTD (finite difference time domain) simulations, which is discussed in detail below.

Figure 6:
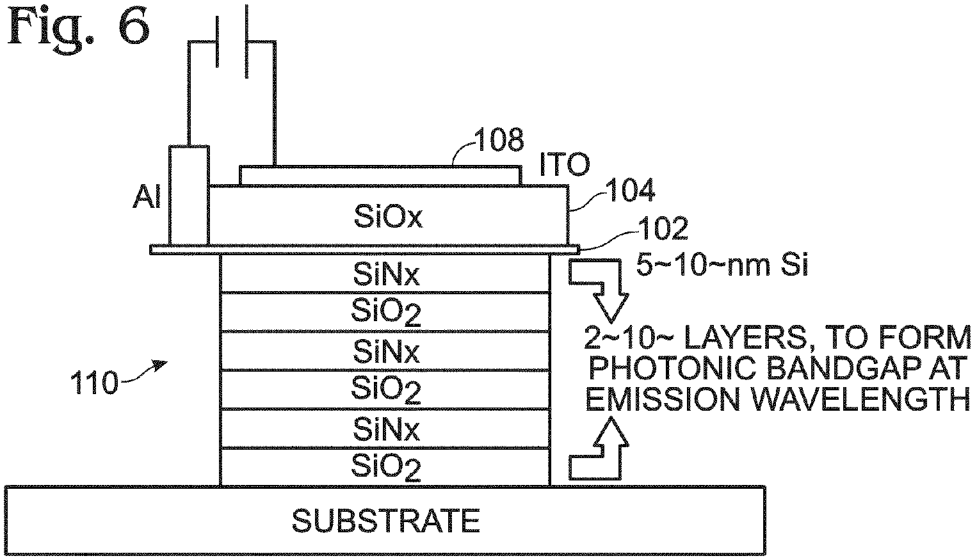
FIG. 6 is a partial cross-sectional view depicting a particular variation of the light emitting device of FIG. 1 in operation.

FIG. 6 is a partial cross-sectional view depicting a particular variation of the light emitting device of FIG. 1 in operation. The device design uses alternatively stacked high refractive index materials, such as Si, SiNx, or $TiO_2$ (in this example —SiNx), and low refractive index materials (e.g., $SiO_2$) under the active SiOx layer 104. These stacking structures form photonic band gaps, i.e. having forbidden ranges for photons of certain wavelengths to propagate freely. For PBG stacking structures, light can only propagate evanescently, i.e., propagate with exponential decays within very short distances. Thus, near 100% light can be reflected back to the incident direction, i.e. into air through ITO electrode 108. Another advantage of the device design is a more direct emission of light from the device, as compared to the emission angular distribution shown in FIG. 5, enhancing the light collection efficiencies of any photodetector.

Figure 14A:
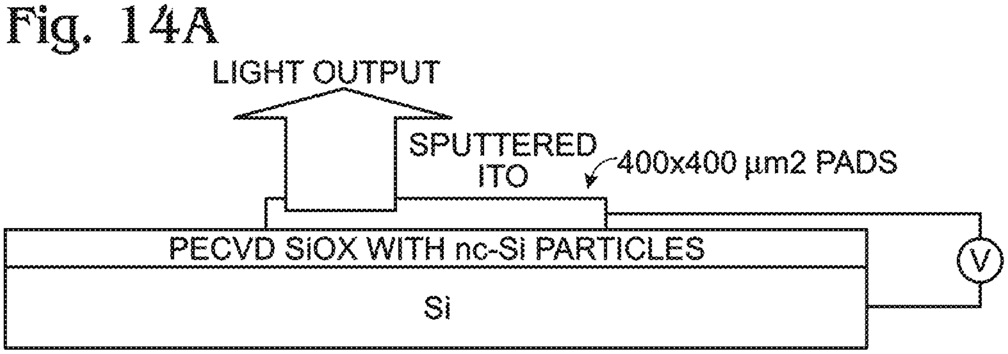
FIGS. 14A and 14B depict a silicon light emitting device and its photoluminescence and electroluminescence spectrum (prior art).
Figure 14B:
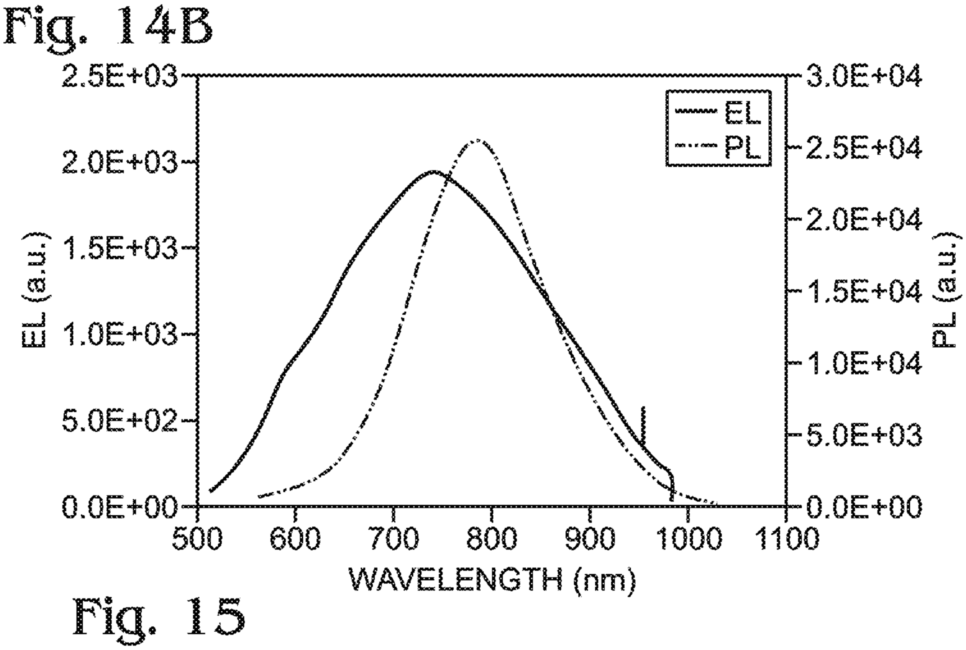
Figure 15:
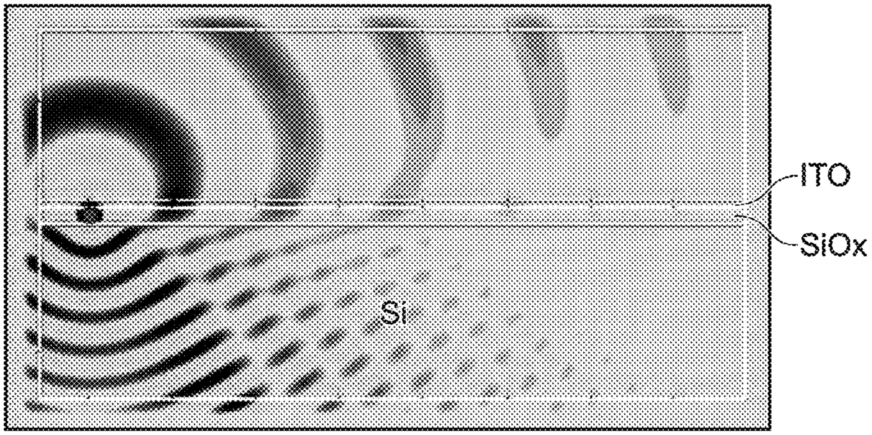
FIG. 15 is a partial cross-sectional view of a finite difference time domain (FDTD) numerical model using the three-layer geometry shown in FIG. 14A.

Considering the poor collection and extraction efficiencies described in the Background in the explanation of FIGS. 14A and 15, enhancements of light extraction from SiOx LEDs to the useful air side of devices can be achieved by forming photonic bandgap in the highly doped Si electrode side of a light emitting device by alternately stacking materials of high and low refractive indexes, as shown in FIGS. 1 and 6. The forming of photonic bandgaps enhances reflectivity from the stacked structures by Bragg reflections.

A point light source inside the SiOx layer can be used to represent emissions from Si nanoparticles in the device of FIG. 6. In this device, SiNx and $SiO_2$ are the alternative high and low refractive index materials, and the device is assumed to be on a glass substrate. The multilayer stack structure acts as a Bragg reflector to reduce the coupling of light into the substrate, improving the extraction efficiency. The structures considered here are samples with a SiOx layer, sandwiched between a Si layer and an ITO layer, and used for electrical excitation.

Figure 7A:
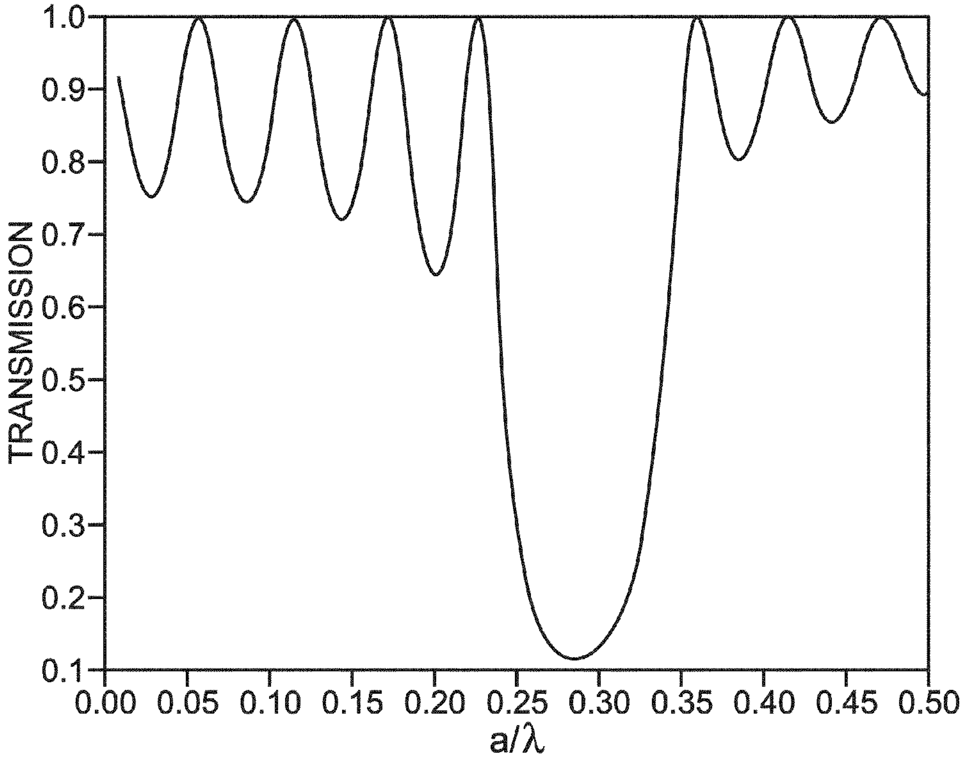
FIGS. 7A and 7B depict transmission through a 10-layer stack of successive $SiO_2$ and $SiN_x$ layers, with incident angles of 0 degrees and 60 degrees, respectively.
Figure 7B:
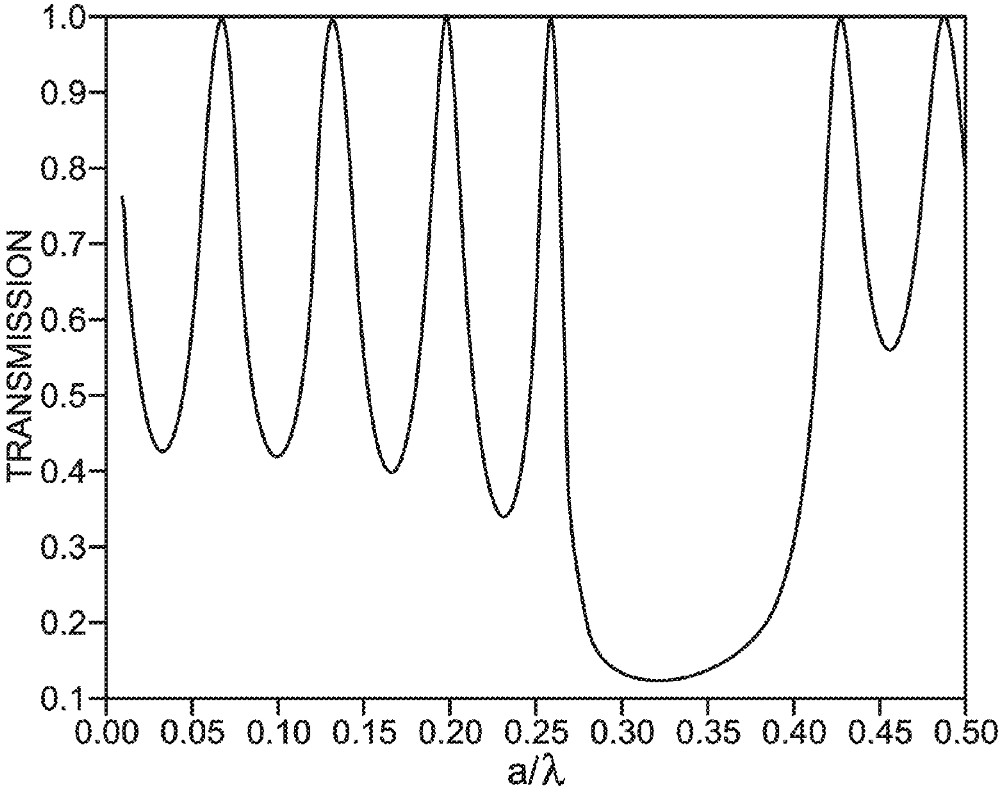
Figure 8A:
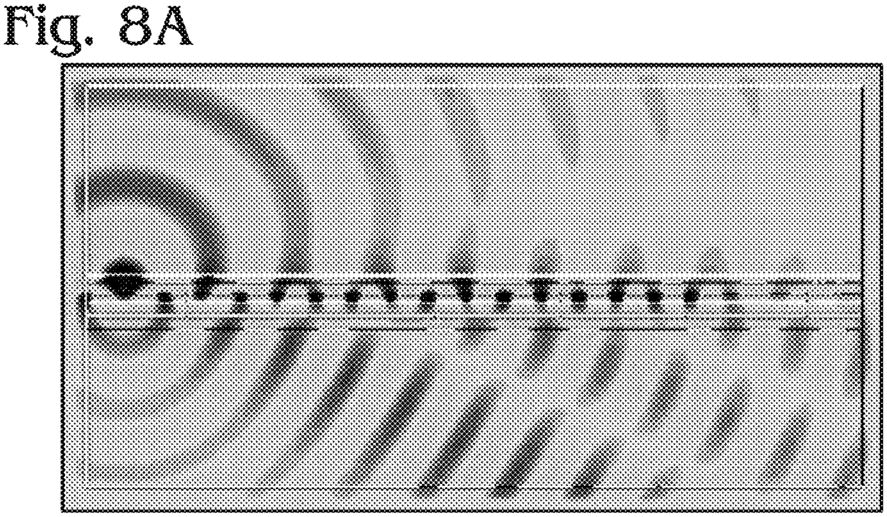
FIGS. 8A through 8D are field profiles of radiated power in different regions of EL devices using different types of Bragg reflectors.
Figure 8B:
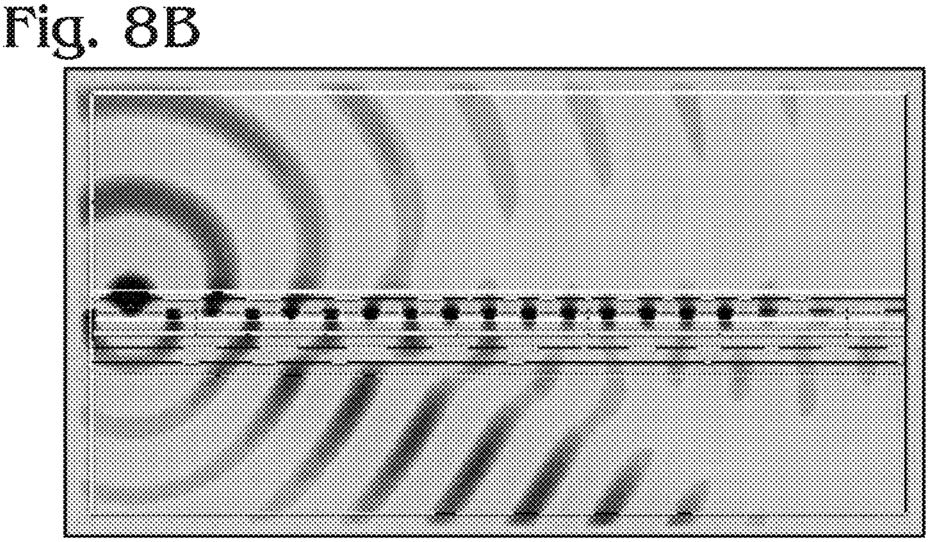
Figure 8C:
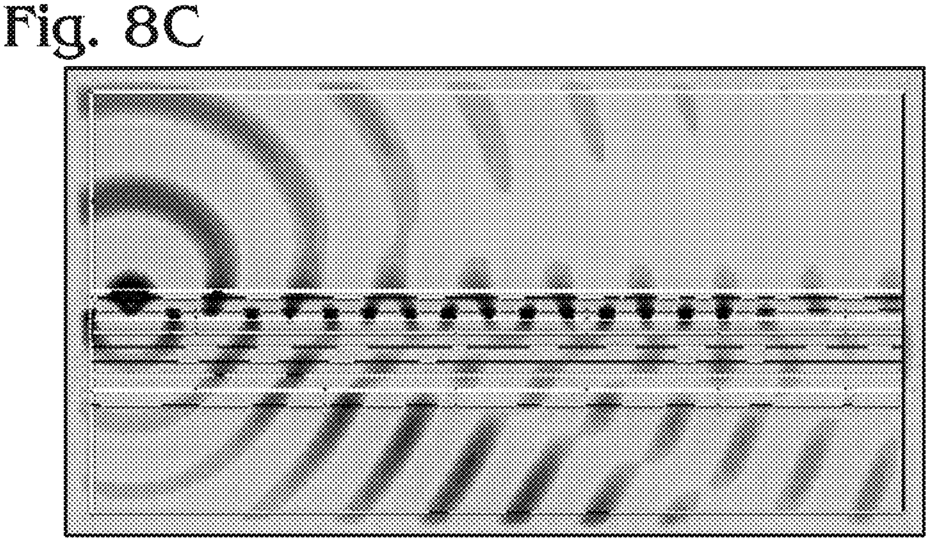
Figure 8D:
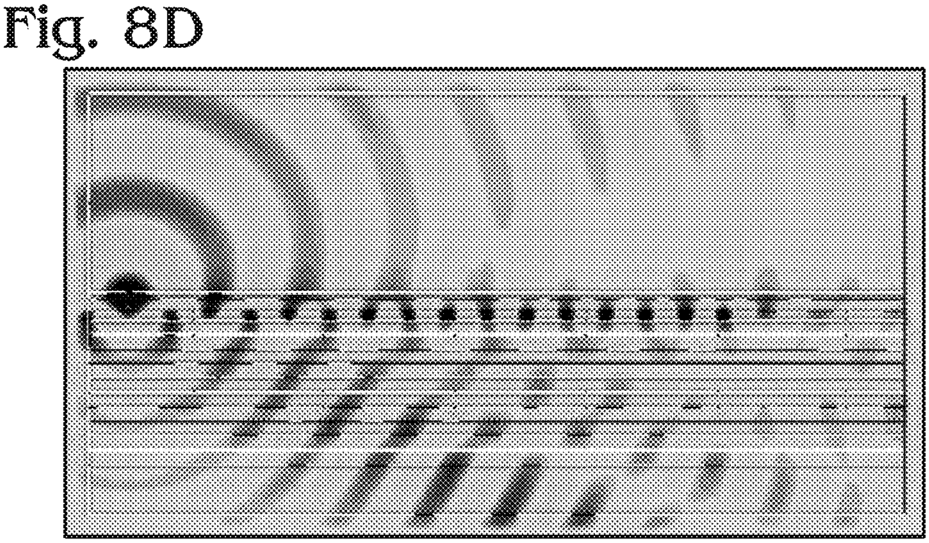

FIGS. 7A and 7B depict transmission through a 10-layer stack of successive $SiO_2$ and $SiN_x$ layers, with incident angles of 0 degrees and 60 degrees, respectively. In both cases, the thickness of each individual layer in the PBG Bragg reflector is 110 nm. The incident wave is assumed to come from a SiOx layer and is transmitted to the glass substrate. The stack of $SiO_2$ and $SiN_x$ layers acts as a periodic Bragg reflector to reflect the emitted light towards air. FIG. 7A shows the transmission response of a periodic multilayer stack consisting of successive layers of 110 nm of $SiO_2$ and 110 nm of $SiN_x$ (the period, $\alpha$, used for normalization is equal to 220 nm) for a normally incident wave. The parameters can be designed for this structure to reflect the majority of power in a desired wavelength range. However, the transmission response is angle-dependent and the same wavelength that is reflected in the normal direction may transmit through this multilayer stack at another angle. This issue is addressed in FIG. 7B by calculating the transmission at 60 degrees for the same structure.

FIGS. 8A through 8D are field profiles of radiated power in different regions of EL devices using different types of Bragg reflectors. The reflective multilayer stacks in FIGS. 8A, 8B, 8C, and 8D are, respectively, 2, 4, 6, and 10 periodic bi-layer stacks of 110 nm $SiN_x$ (top film) and 110 nm $SiO_2$ (bottom film). The SiOx active layer is placed on a Si electrode with an ITO electrode on top. The thickness of the ITO layer is 50 nm, and the thickness of the SiOx is 80 nm. All radiation patterns are calculated at the operation wavelength of 750 nm.

The different number of periodic layers in the reflective stack structure shows the effect of these layers on extraction efficiency and radiation pattern. It can be observed that transmission to the substrate region in the normal direction is strongly suppressed. However, as expected from the results in FIGS. 7A and 7B, larger angles can still propagate through the stack of layers. The extraction efficiencies and collection efficiency are calculated for all these cases and the results are summarized in Table 1. An overall collection efficiency of around 2.1% can be achieved using a 6-layer stack, which is a factor of 3 better than extraction efficiency in a structure with no reflective stack (FIG. 14A).

TABLE 1

Extraction and collection efficiency of different structures.

| Structure | Extraction Efficiency | Guiding Efficiency | Collection Efficiency |
|---|---|---|---|
| 2-layer stack | 28.9% | 26.8% | 1.70% |
| 4-layer stack | 29.4% | 24.2% | 1.67% |
| 6-layer stack | 28.8% | 25.8% | 2.11% |
| 10-layer stack | 28.1% | 25.3% | 1.93% |

In order to further improve the extraction efficiency, one option is to change the thicknesses of the layers throughout the multilayer stack so that some of the layers reflect larger incident angles. To achieve this result, the thickness of the layers in the stack can be increased so that at the same operational wavelength, higher incident angles are totally reflected from those layers.

Figure 9A:
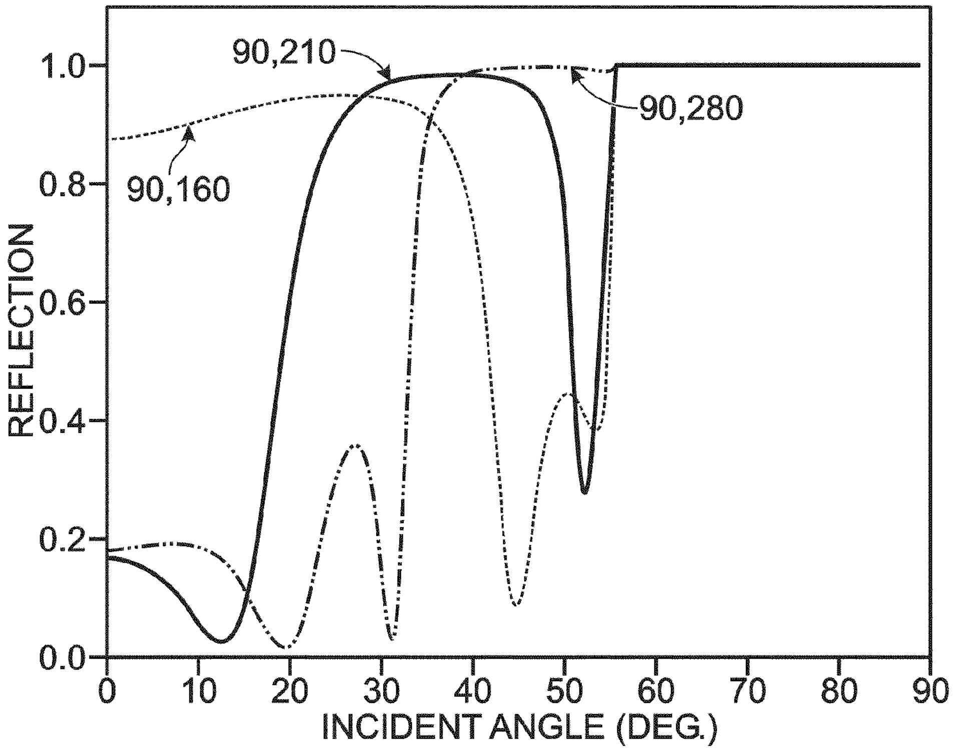
FIGS. 9A and 9B depict the calculated reflection for a 10-layer stack of periodic $SiO_2$ and $SiN_x$ layers with different thicknesses of $SiO_2$.
Figure 9B:
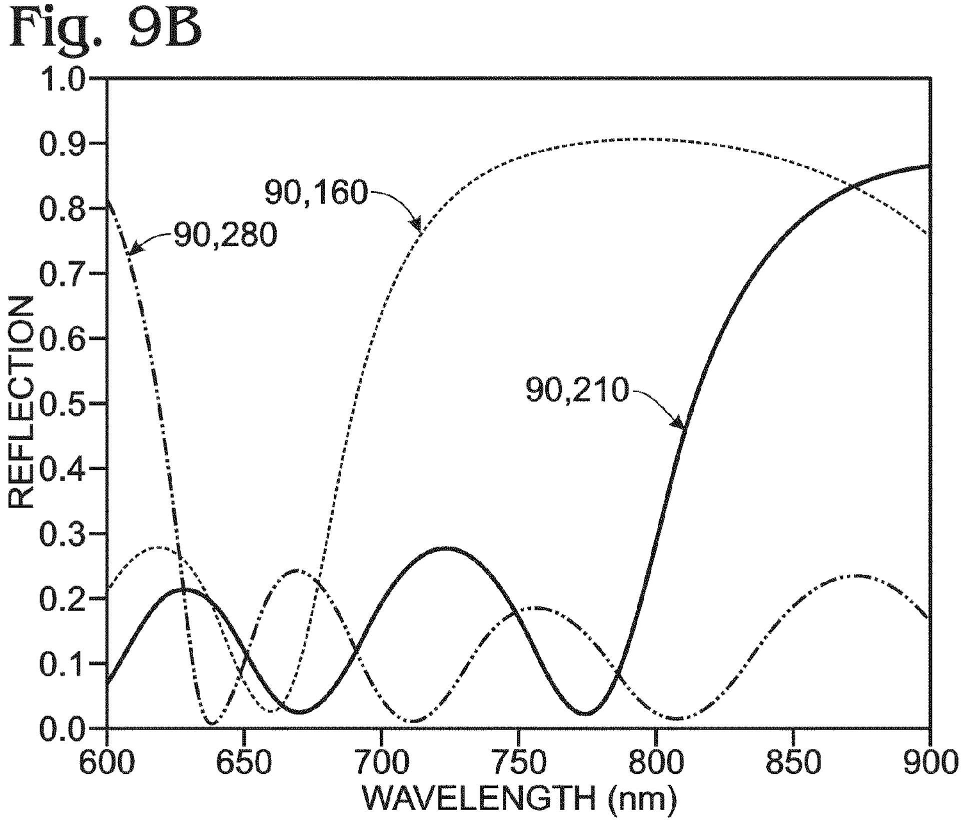

FIGS. 9A and 9B depict the calculated reflection for a 10-layer stack of periodic $SiO_2$ and $SiN_x$ layers with different thicknesses of $SiO_2$. In FIG. 9A, each SiNx layer is 90 nm thick, and 160, 210, and 280 nm thickness of oxide are shown for different incident angles at the operational wavelength of 750 nm. FIG. 9B is the spectral response of the same structures as in FIG. 9A, calculated and plotted for a normally incident input wave.

FIG. 9A shows that by modifying the thickness, it is possible to cover different ranges of angles. By having all these layers in the stack, it is possible, in principal at least, to achieve reflection for all incident angles. Note that when the thickness is changed, the normal incident is not necessarily reflected from all layers, as is demonstrated in FIG. 9B.

In one aspect, the PBG Bragg reflector uses 8 periodic bi-layers with alternating layers of $SiO_2$ and $SiN_x$. All the $SiO_2$ layers are 110 nm in thickness, while the thicknesses of the $SiN_x$ layers are 110 nm, 110 nm, 130 nm, and 150 nm (ordered from top layer to the bottom layer). The resulting structure has an extraction efficiency of 30% and a collection efficiency of 2.9%, which is 4 times improvement over the simple structure with no reflective stack shown in FIG. 14A, which has a 0.7% collection efficiency.

Figure 10:
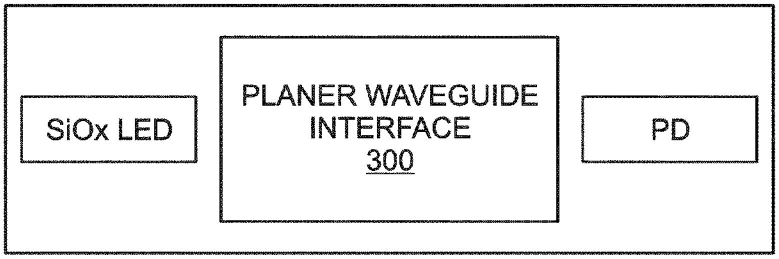
FIG. 10 is a schematic block diagram depicting the planar waveguide of FIG. 3, as used in a CMOS compatible integrated optical circuit application.
Figure 11A:
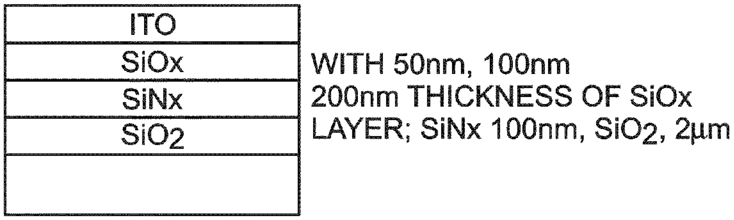
FIGS. 11A through 11D are field profiles of radiated power to different regions of a waveguide interface.

FIG. 10 is a schematic block diagram depicting the planar waveguide of FIG. 3, as used in a CMOS compatible integrated optical circuit application. Integrated with CMOS compatible photodetector (PD) technologies, monolithic CMOS compatible optical circuits such as light sources, photodetectors and waveguides, can be fabricated for optical interconnector and sensing applications.

FIGS. 11A through 11D are field profiles of radiated power to different regions of a waveguide interface. The waveguides consist of a SiOx active layer grown on a SiN layer, on top of a $SiO_2$ buffer layer, with an ITO electrode on top. The thickness of the ITO layer is 50 nm, the thickness of the SiN layer is 100 nm, and the thickness of the SiOx is 50 nm in FIG. 12*b*, 100 nm in FIG. 12C, and 200 nm in FIG. 12D. All radiation patterns are calculated at a typical operation wavelength of 750 nm.

In order to achieve waveguide modes, a low refractive index (n=1.45) $SiO_2$ material with a relatively large thickness (>1 μm) is used as a buffer layer to isolate the device from the bottom substrate. In addition, to optimize the waveguiding effect, SiNx layers with a refractive index similar to SiOx (i.e. n~2.0), is used beneath the thin poly Si electrodes (~10 nm for a small loss) on top of each $SiO_2$ buffer layer. The relatively thick buffer layer, $SiO_2$ in this case, provides enough index contrast so that the structure supports a confined mode in the ITO-SiOx-SiN layers.

For thicker SiOx layers, the extraction efficiency increases. The extraction efficiency to air increases from 15.1% in the sample with 50 nm SiOx, to 18.4% in the sample with 100 nm SiOx, and to 19.9% for the sample with 200 nm SiOx. However, the efficiency of coupling to the guided mode in SiNx layer remains around 50% in all cases. This insensitivity of the SiOx active layer is helpful in integration design.

There exists strong leakage of light into the bottom substrate even with a 2 μm $SiO_2$ buffer. One way to limit this leakage is to use multiple layer structures with alternative high and low optical index to form the Bragg reflections to prevent light leakages.

The high and low optical index materials can be SiNx (n~2.0) and $SiO_2$ (n~1.45). However, since the index contrasts are low, the bandgaps formed from the stack may not be optimal in suppressing light, with large incident angles, into the substrate. As an alternative, higher indexed Si (n~3.45) can be used to replace SiNx. Since the light does not propagate deep inside the stacking structures, the higher loss from the absorption of Si is not significant. A comparison of examples using SiNx and Si as the higher index layer is presented below.

Figure 12A:
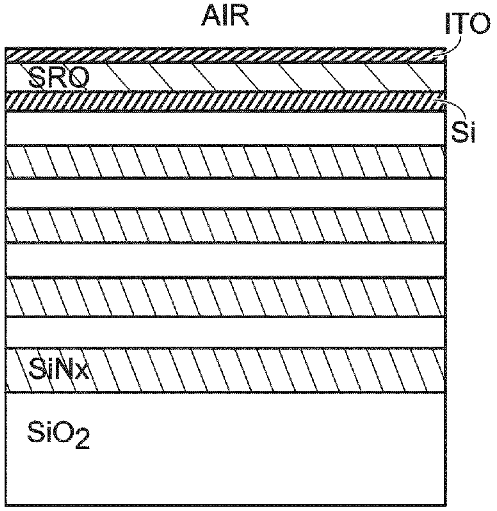
FIGS. 12A and 12B depict alternate variations of a PBG Bragg reflector using $SiN_x$ vs. Si layers.
Figure 12B:
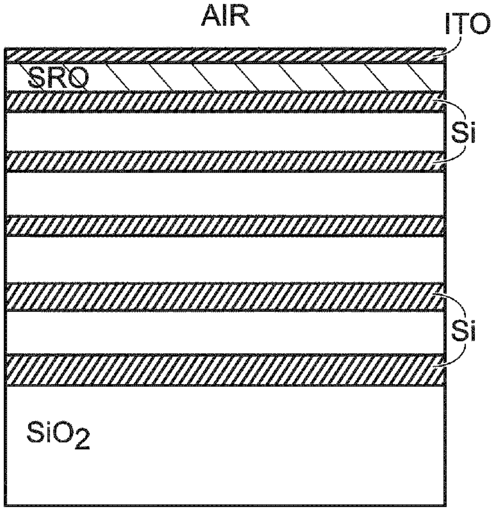
Figure 11B:
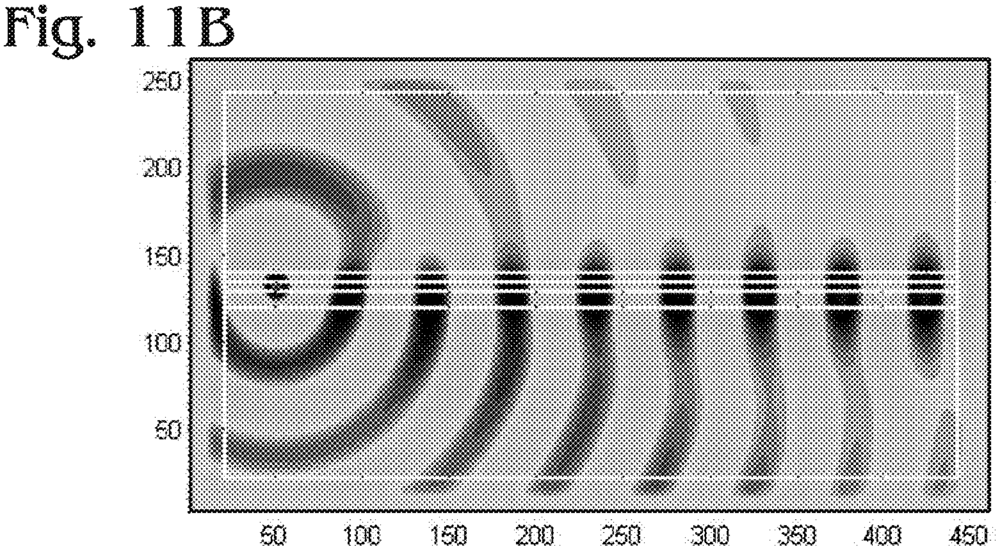
Figure 11C:
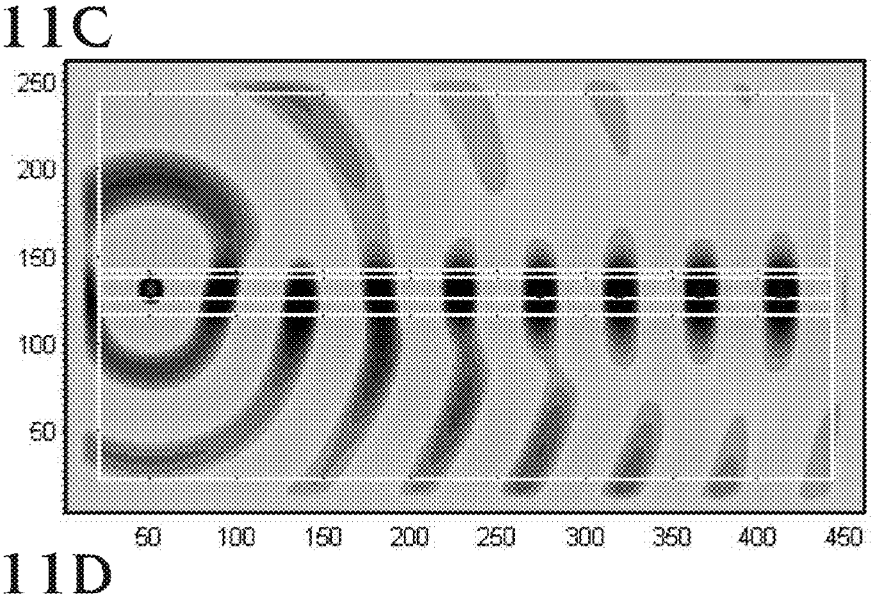
Figure 11D:
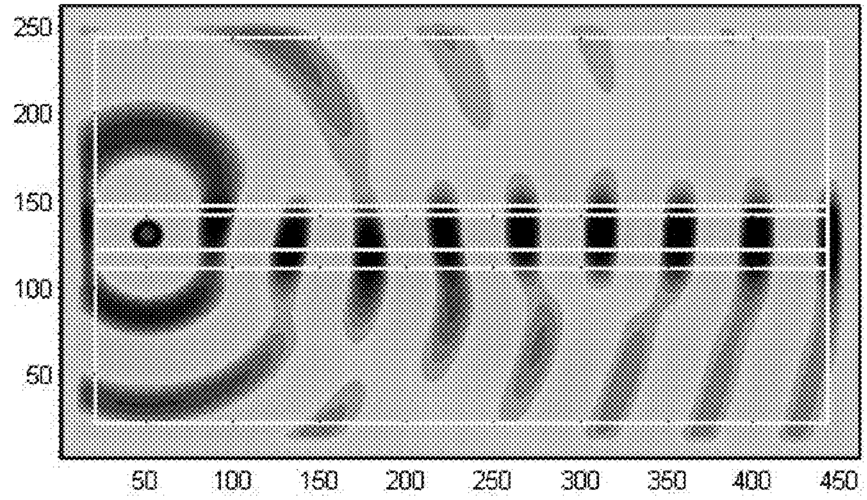
Figure 13A:
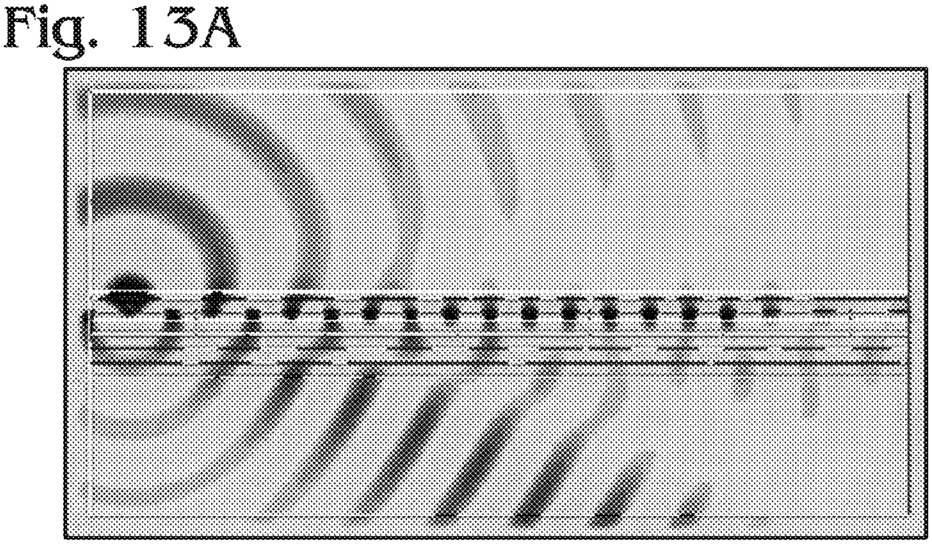
FIGS. 13A through 13F are field profiles of radiated power to different regions of planar waveguide interfaces with different Bragg reflectors.
Figure 13B:
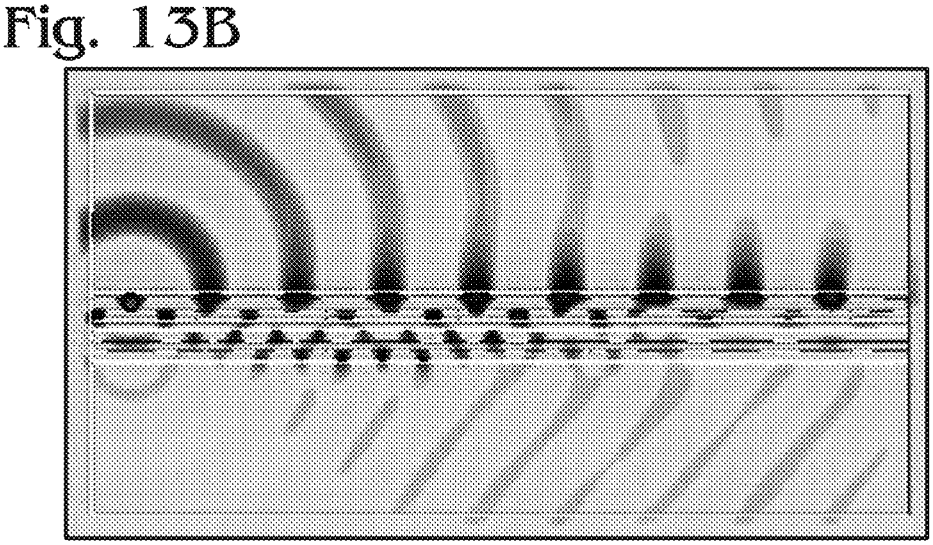
Figure 13C:
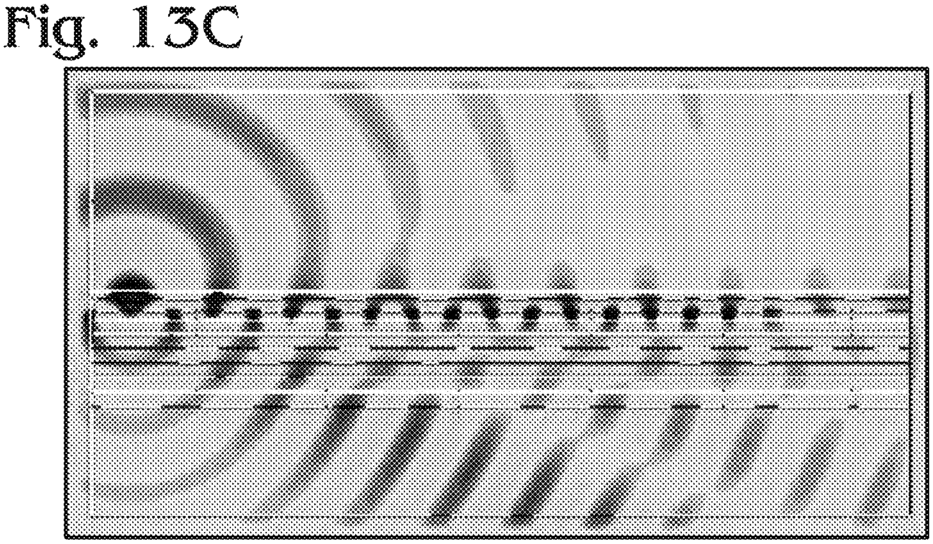
Figure 13D:
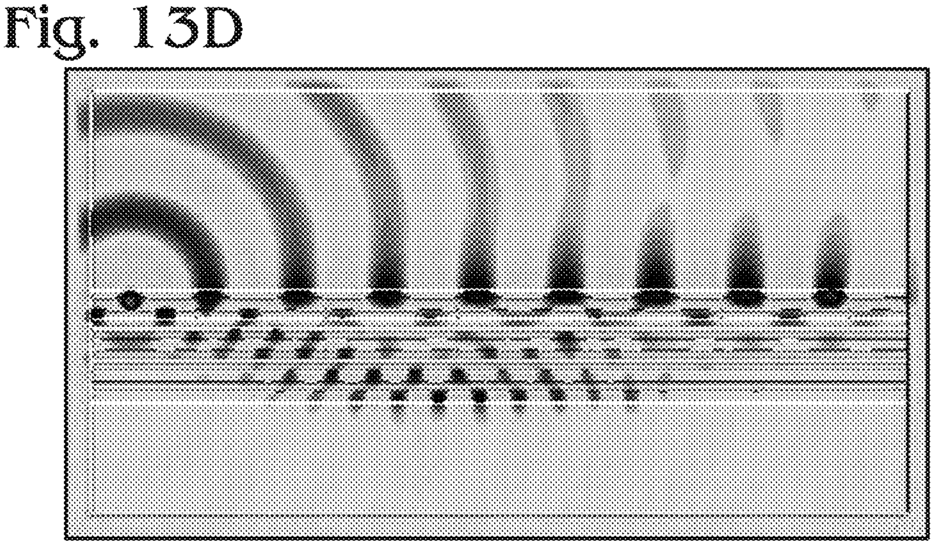
Figure 13E:
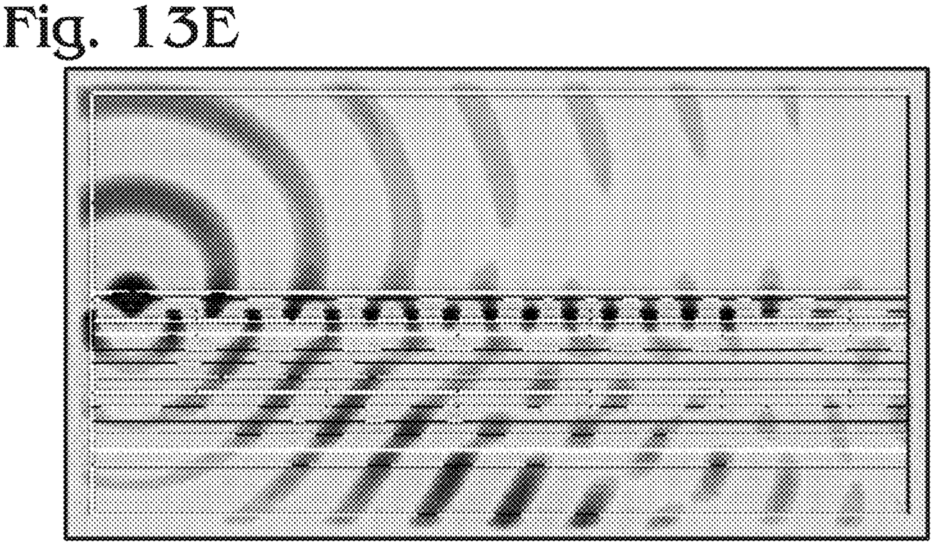
Figure 13F:
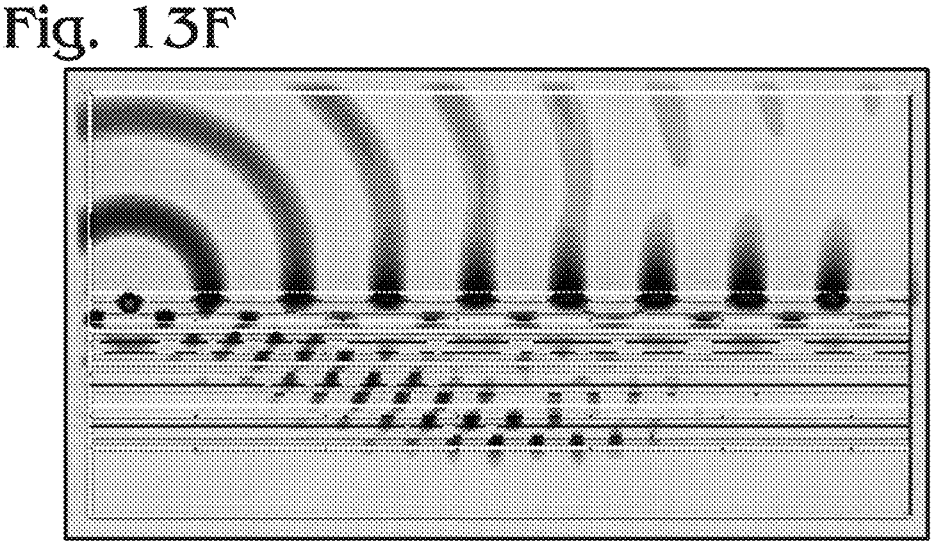

FIGS. 12A and 12B depict alternate variations of a PBG Bragg reflector using SiNx vs. Si layers. The SiOx active layer is sandwiched between Si and ITO electrodes. FIG. 12A depicts a period of $SiO_2$ and $SiN_x$ layers, while FIG. 12B depicts a period of $SiO_2$ and Si layers. It is assumed that both structures are fabricated on glass substrates. The index contrast between $SiO_2$ and $SiN_x$, is not enough to provide omnidirectional reflection from the stack, and waves at larger angles propagate through the periodic stack. To avoid this issue, stacks of Si and $SiO_2$ layers (with a larger index contrast) are used as the reflector. As in FIG. 12A, the ITO electrode is 50 nm, the SiOx active layer is 90 nm, and the Si bottom electrode is 60 nm. However, instead of successive layers of 110 nm of $SiO_2$ and $SiN_x$, the device of FIG. 12B uses 80 nm-thick layers of Si and $SiO_2$. A smaller lattice constant (thickness of double layers) in this case is used to compensate for the higher index contrast, making the center of the gap in the normal direction in the 750 nm to 800 nm wavelength range.

FIGS. 13A through 13F are field profiles of radiated power to different regions of planar waveguide interfaces with different Bragg reflectors. The SiOx active layer is placed between Si and ITO electrodes. The thickness of the ITO layer is 50 nm, and the thickness of the SiOx is 90 nm. All radiation patterns are calculated at the operational wavelength of 750 nm. The reflective multilayer stacks in FIGS. 13A, 13C, and 13E consist, respectively, of 4, 6, and 10 alternating layers of 110 nm-thick $SiN_x$ and 110 nm-thick $SiO_2$ in a periodic stack. The reflective multilayer stacks in FIGS. 13B, 13D, and 13F consist, respectively, of 4, 6, and 8 alternating layers of 80 nm-thick Si and 80 nm-thick $SiO_2$ in a periodic stack.

It can be observed that when the Si—$SiO_2$ stack is used, transmission of light to the substrate region is strongly suppressed. In contrast to the $SiO_2$ and $SiN_x$ periodic stack, the higher index contrast of Si creates an omnidirectional suppression, i.e. covering a larger angular distribution of light. Table 2 summarizes the results. It can be clearly seen that for Si structures, the loss of the light to the air is almost the same for different number of layers, while the coupling to the waveguide can be increased up to 60%, with the two intensities summing to near 100%. For SiNx case, a larger amount of light (near 50% at large incident angles) had been absorbed by the Si substrate below the Bragg stacks.

TABLE 2

| Extraction and collection efficiency | | | | |
|---|---|---|---|---|
| | SiNx | | Si | |
| Structure | Into Air | Guiding | Into Air | Guiding |
| 2-layer stack | 28.9% | 26.8% | 36.8% | 57.1% |
| 4-layer stack | 29.4% | 24.2% | 37.8% | 61.7% |
| 6-layer stack | 28.8% | 25.8% | 37.9% | 61.8% |

Single-sided photonic bandgap light emitting and waveguide devices have been provided. Particular materials and dimensions have been presented as examples to illustrate the invention. However, the invention is not limited to merely these examples. Other variations and embodiments will occur to those skilled in the art.

We claim:

1. A light emitting device with a single-sided photonic bandgap, the light emitting device comprising:

a heavily doped silicon (Si) bottom electrode;

a silicon (Si)-containing dielectric layer embedded with Si nanoparticles overlying the bottom electrode;

a transparent indium tin oxide (ITO) top electrode overlying the Si-containing dielectric layer; and, a photonic bandgap (PBG) Bragg reflector underlying the Si bottom electrode, including at least one periodic bi-layer of films with different refractive indexes, where each film in the PBG Bragg reflector has planar top and bottom surfaces.

2. The light emitting device of claim 1 wherein the PBG Bragg reflector periodic bi-layer bottom film is $SiO_2$ and the top film is SiNx, where X<2.

3. The light emitting device of claim 1 wherein the PBG Bragg reflector includes at least 2 bi-layer periods.

4. The light emitting device of claim 1 wherein the PBG Bragg reflector periodic bi-layer bottom film is Si and the top film is $SiO_2$.

5. The light emitting device of claim 1 wherein the Si-containing dielectric layer includes Si nanoparticles with a size in a range of about 2 to 7 nanometers (nm).

6. The light emitting device of claim 1 wherein the Si-containing dielectric layer has a thickness in a range of about 10 to 300 nm.

7. The light emitting device of claim 1 where in the ITO top electrode emits light with an efficiency of greater than 20%.

8. The light emitting device of claim 1 wherein the Si-containing dielectric layer is an SiOx layer; and, wherein the peak light wavelength reflectivity of each periodic bi-layer is about equal to the peak wavelength of light emitted by the Si nanoparticles in the SiOx layer.

9. The light emitting device of claim 1 wherein the thickness of each bottom film (d2)×(n2)+the thickness of each top film (d1)×(n1)=the peak wavelength of light emitted by the Si nanoparticles times a number selected from a group consisting of 0.5 and 0.25.

10. The light emitting device of claim 1 wherein the PBG Bragg reflector includes a periodic bi-layer stack with a bottom film having a second refractive index (n2) underlying a top film with a first refractive index (n1), less than the second refractive index.

11. The light emitting device of claim 1 wherein the Si-containing dielectric layer is a material selected from a group consisting of Si, SiNx, where X<2, and SiOx, where X<2.

12. A single-sided photonic bandgap planar waveguide interface, the interface comprising:

a planar waveguide formed from a silicon (Si)-containing dielectric material embedded with Si nanoparticles;

a photonic bandgap (PBG) Bragg reflector underlying the planar waveguide, including at least one periodic bi-layer of films, both with refractive indexes less than, or equal to the refractive index of the planar waveguide, and greater than 1, and where each film in the PBG Bragg reflector has planar top and bottom surfaces; and, a heavily doped Si bottom electrode interposed between the planar waveguide and the PBG Bragg reflector; and, a transparent indium tin oxide (ITO) to electrode overlying the planar waveguide.

13. The interface of claim 12 wherein the PBG Bragg reflector includes a periodic bi-layer with a bottom film having a second refractive index (n2) underlying a top film with a first refractive index (n1), less than the second refractive index.

14. The interface of claim 13 wherein the PBG Bragg reflector periodic bi-layer top film is $SiO_2$ and the bottom film is Si.

15. The interface of claim 12 wherein the PBG Bragg reflector includes at least 2 bi-layer periods.

16. The interface of claim 13 wherein the PBG Bragg reflector periodic bi-layer bottom film is SiNx and the top film is $SiO_2$, where X<2.

17. The interface of claim 12 wherein the Si-containing planar waveguide material includes Si nanoparticles with a size in a range of about 2 to 7 nanometers (nm).

18. The interface of claim 12 wherein the planar waveguide has a thickness of greater than 150 nm.

19. The interface of claim 12 wherein the thickness of each bottom film (d2)(n2)+the thickness of each top film (d1)(n1) =the peak wavelength of light emitted by the Si nanoparticles times a number selected from a group consisting of 0.5 and 0.25.

20. The interface of claim 12 wherein the planar waveguide has a coupling efficiency of greater than 10%.

21. The interface of claim 12 wherein the planar waveguide is a material selected from a group consisting of Si, SiNx, where X<2, and SiOx, where X<2.

* * * * *